United States Patent Office  3,432,492
Patented Mar. 11, 1969

---

3,432,492
6,7-CYCLOPENTANONO AND 6,7-CYCLOPENTANO STEROIDS
John H. Fried, Palo Alto, Calif., assignor to Syntex Corporation, Panama, Panama, a corporation of Panama
No Drawing. Filed Sept. 19, 1966, Ser. No. 580,199
U.S. Cl. 260—239.55                  20 Claims
Int. Cl. C07c *173/00, 169/34, 169/22*

This invention relates to novel steroids and to a method for their preparation. More particularly, it relates to novel steroids of the pregnane and androstane series containing a cyclopentanono or cylcopentano moiety fused to the C-6 and C-7 carbon atoms of the steroid nucleus. Specifically, it relates to cyclopentan-1-ono-[3',4';6,7] and 6,7-cyclopentano steroids of the pregnane and androstane series and the 19-nor and $\Delta^{1,4}$ analogs thereof.

The compounds of the present invention demonstrate hormonal activities characteristic of the parent steroids. The pharmacologically active steroids of the present invention may be represented by the following partial formulas in which the novel feature is shown:

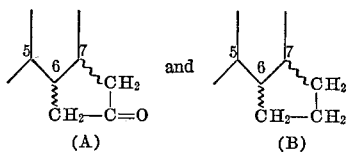

The wavy line in the above partial formulas, indicates both alpha and beta configurations. In the practice of the process, a mixture of isomers is obtained which contains the 6α,7α and 6β,7β-isomers of the above partial Formulas A and B.

The process for preparing the novel steroids containing the novel cyclopentanono and cyclopentano moieties is shown by the following reaction sequence, wherein partial formulas involving only rings A and B are shown:

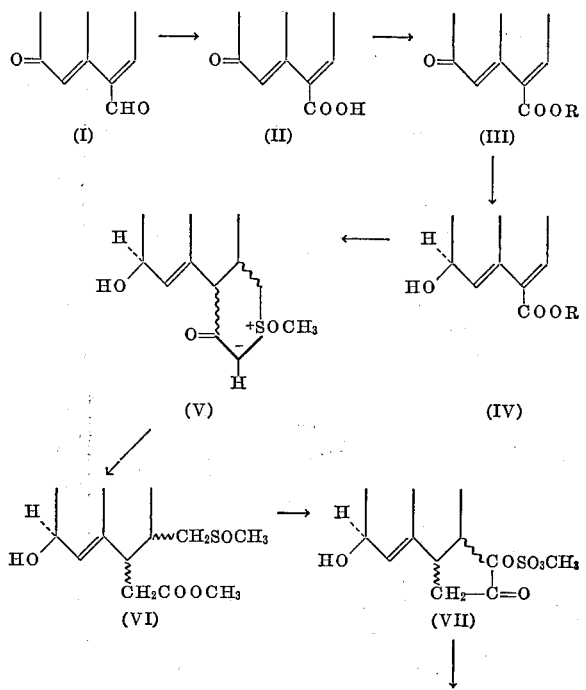

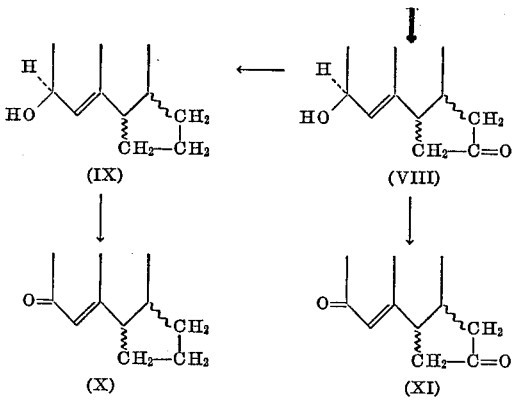

wherein R is lower alkyl.

By the term lower alkyl is meant a straight chain group containing from 1 to 4 carbon atoms, inclusive.

In the practice of the above process, a 3-keto-6-formyl-$\Delta^{4,6}$-diene steroid of partial Formula I is oxidized by treatment with silver oxide in a solvent, such as ethanol or the like to form a corresponding 3-keto-6-carboxy-$\Delta^{4,6}$-diene of partial Formula II. For example, the 3-keto-6-formyl-$\Delta^{4,6}$-diene steroid in ethanol is treated with a concentrated aqueous solution of silver nitrate and potassium hydroxide at about 25° C. for a period of several days. A conventional esterification of the thus obtained 3-keto-6-carboxy-$\Delta^{4,6}$-diene steroid, such as with an alcohol and acid catalysis or with diazomethane, affords a corresponding 3-keto-6-carboalkoxy-$\Delta^{4,6}$-diene steroid, represented by partial Formula III. In this esterification, the alcohol contains from 1 to 4 carbon atoms, inclusive.

The 3-keto group in a compound of partial Formula III is then reduced to a 3β-hydroxy compound of partial Formula IV by treatment with a conventional reducing agent, such as sodium borohydride in methanol.

A thus-obtained 3β-hydroxy-$\Delta^{4,6}$-diene-6-carboalkoxy steroid of partial Formula IV is allowed to react with dimethylsulfoxonium methylide which undergoes addition at the C-7 position followed by cyclization to afford a cyclic β-keto-sulfoxonium ylide as represented by partial Formula V. Thus, the 6-carboalkoxy steroid of partial Formula IV is allowed to react with the dimethylsulfoxonium methylide in an inert organic solvent, such as tetrahydrofuran, at reflux for a period of time of about four hours. The compounds of partial Formula V exist as isomers having both the alpha and beta configurations, i.e. the 6α,7α and 6β,7β-isomers. In practice, the compound of partial Formula V is an intermediate which is formed in situ and used in the subsequent reaction.

The thus-obtained isomeric mixture of cyclic β-ketosulfoxonium ylides of partial Formula V is dissolved in a low molecular weight alcohol, preferably methanol, and then irradiated with light of a wave length of about 253 mu to afford a sulfoxide ester, as represented by partial Formula VI. The 253 mu light is provided by a low-pressure mercury arc lamp. The compounds of partial Formula VI exist as isomers having both the alpha and beta configurations, i.e. the 6α, 7α and 6β, 7β-isomers, and are readily separated by a conventional technique, such as chromatography on alumina. Alternatively, the mixture of isomers is carried through to the final product and then separated by this method.

A thus-obtained sulfoxide ester compound of partial Formula VI is allowed to react with 30% aqueous hydrogen peroxide at about 35° C. for a period of two or more hours in an acetic acid solvent to afford a corresponding sulfone intermediate; the latter undergoes cyclization in the presence of a base, preferably potassium t-butoxide, to afford a keto sulfone of partial Formula VII.

The keto sulfone of partial Formula VII is allowed to react with aluminum-amalgam [according to the procedure of Corey, E. J., et al., J. Am. Chem. Soc., 86, 1639 (1964)] to afford a novel cyclopentanono compound of the present invention, as represented by partial Formula VIII.

A cyclopentanono compound of partial Formula VIII is then reduced to a corresponding cyclopentano compound of partial Formula IX via a conventional Wolff-Kishner reduction, such as by reaction with hydrazine hydrate and potassium hydroxide in diethylene glycol under reflux conditions for a period of about one hour.

The 3β-hydroxy group in a compound of partial Formula VIII or IX is oxidized to a 3-keto group by treatment with a conventional oxidizing agent, such as manganese dioxide in chloroform or a Jones oxidation to afford the final compounds of partial Formulas X and XI, respectively.

A mixture of isomers having both the alpha and beta configurations, i.e. the 6α,7α and 6β,7β-isomers, are routinely obtained for the above compounds from partial Formulas V through XI. In practice, the mixture of isomers is separated by a conventional technique, such as column chromatography. Preferably, the isomers are separated after formation of the cyclopentanono or cyclopentano moieties and regeneration of the 3-keto group as described above.

In the practice of the process, two methods are available for preparing the 3-keto-Δ$^{4,6}$-diene-6-formyl steroid starting material of partial Formula I, as shown by the following reaction sequence:

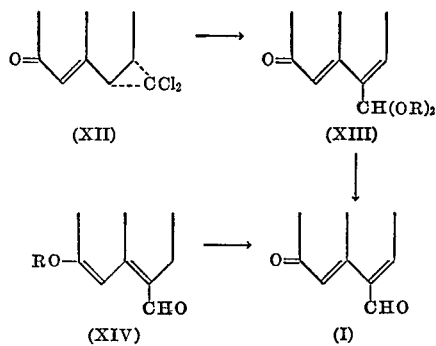

wherein R is lower alkyl. In the first method, shown by the sequence (XII)→(XIII)→(I), a 6α,7α-dichloromethylene steroid of the pregnane or androstane series, as shown by partial Formula XII, is hydrolyzed by treatment with a basic alcoholic solution to form the corresponding acetal, as shown by partial Formula XIII. In this conversion, the basic alcoholic solution is a solution of an alkali metal hydroxide in a low molecular weight alcohol, such as methanol, ethanol, propanol or butanol. The preferred basic alcoholic solution is a solution of sodium hydroxide in methanol.

The thus-formed acetal of partial Formula XIII is hydrolyzed by treatment with an acidic solution to form the 3-keto-Δ$^{4,6}$-diene-6-formyl intermediate of partial Formula I. The acidic solution is an aqueous solution of an acid, i.e. hydrochloric acid, acetic acid, sulfuric acid, nitric acid or the like. The preferred method of acid hydrolysis is by treatment with an aqueous solution of acetic acid in dioxane for a period of three or four hours.

In the second method, shown by the sequence (XIV)→(I), the starting material of partial Formula I is prepared from a 6-formyl-3-enol ether of the pregnane or androstane series. The latter ethers are conveniently prepared by the reaction of a 3-enol ether with a Vilsmeier reagent as described by D. Burn et al., Tetrahedron, 20, 597–609 (1964). Thus, a steroid of partial Formula XIV is allowed to react with 2,3-dichloro-5,6-dicyanobenzoquinone in the presence of an acid and an inert organic solvent at about 0° C. to afford a 3-keto-Δ$^{4,6}$-diene-6-formyl steroid, represented by partial Formula I. A preferred choice of acid and solvent for this conversion is p-toluenesulfonic acid and tetrahydrofuran, respectively.

The novel 6,7-cyclopentanono and 6,7-cyclopentano steroids of the present invention are represented by the following formulas:

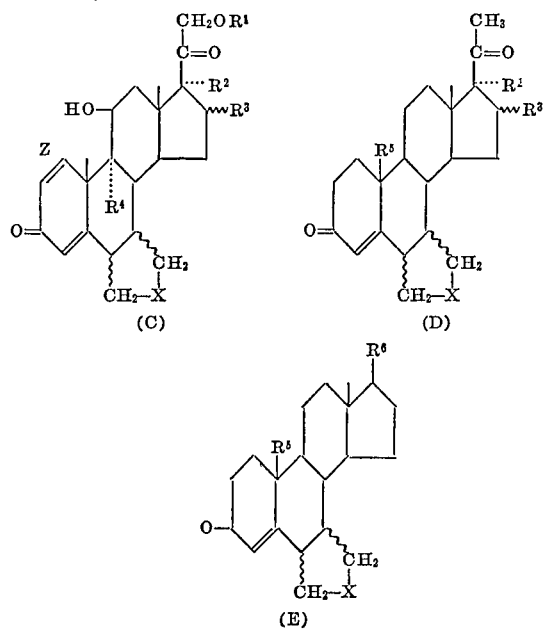

wherein
X is a methylene or carbonyl group;
Z is a carbon-carbon single bond or a carbon-carbon double bond;
R$^1$ is hydrogen, tetrahydropyran-2′-yl, tetrahydrofuran-2′-yl or a hydrocarobn carboxylic acyl group containing less than 12 carbon atoms;
R$^2$ is hydrogen, hydroxy or a hydrocarbon carboxylic acyloxy group containing less than 12 carbon atoms;
R$^3$ is hydrogen, α-methyl, β-methyl, α-hydroxy or a α-hydrocarbon carboxylic acyloxy group of less than 12 carbon atoms;
R$^2$ and R$^3$ together is the group

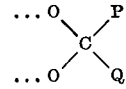

in which P is hydrogen or lower alkyl and Q is lower alkyl or aryl of up to 8 carbon atoms;
R$^4$ is hydrogen or fluoro;
R$^5$ is hydrogen or methyl; and
R$^6$ is keto or the group

in which R$^7$ is hydrogen, tetrahydropyran-2′-yl, tetrahydrofuran-2′-yl or a hydrocarbon carboxylic acyl group containing less than 12 carbon atoms, and R$^8$ is hydrogen, lower alkyl, alkenyl or alkynyl.

By the term lower alkyl, alkenyl or alkynyl is meant a group containing up to 4 carbon atoms. For example, alkyl includes methyl, ethyl, propyl and the like; alkenyl includes vinyl and the like; and alkynyl includes ethynyl and the like.

The hydrocarbon carboxylic acyl and acyloxy groups of the present invention will contain less than 12 carbon atoms and may be of a straight, branched, cyclic or cyclic-aliphatic chain structure. This structure may be saturated, unsaturated or aromatic and optionally substituted by functional groups, such as hydroxy, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, $\beta$-chloropropionate, adamantoate, and the like.

The novel steroids represented by Formula C are cortical hormones with high anti-inflammatory and low catabolic activities and are useful in the treatment of rheumatoid arthritis, contact dermatitis, allergies and the like. The novel steroids represented by Formula D are progestational agents and are useful in fertility control and the management of various menstrual disorders. The latter class of steroids also possess hormonal properties characteristic of anti-androgenic, anti-gonadotrophic and anti-estrogenic agents. The novel steroids of Formula E are anabolic agents, having a favorable anabolic-androgenic ratio and are useful post-operatively and in geriatrics for tissue build-up. In addition, the steroids of Formula E bearing a 17$\alpha$-ethynyl, vinyl or ethyl substituent are progestational agents and useful in oral contraception. The compounds of the present invention are administered by usual routes, i.e. orally, parenterally or topically, in pharmaceutically acceptable compositions at dosage rates of from 0.5$\gamma$ to 5 mg./kg./day; the most favorable dosage rate being conditioned upon the purpose for which it is administered and the response thereto.

The novel hormonal agents of Formulas C, D and E can contain substituents, groupings, combinations, and elaborations thereof, in addition to those illustrated in the above formula known to those skilled in the art of steroid chemistry. For example, the novel cortical hormones of the above formula can contain other known combinations and elaborations of the 3-keto-$\Delta^4$ system or the 3-keto-$\Delta^{1,4}$ system, such as 3$\beta$-hydroxy, a 3$\beta$-ether, such as tetrahydropyran-2'-yloxy or tetrahydrofuran-2'-yloxy and a 3$\beta$-ester, such as acetoxy, propionoxy and the like. In addition, in a compound of Formula C, other known cortical hormone elaborations of the 17$\alpha$,21-dihydroxy-20-keto side chain can be present, such as for example, 17$\alpha$,21-cyclic acetal or ketal, 21-fluoro, and the like.

In the practice of preparing the novel compounds represented by Formulas C, D and E, keto groups in the 3, 17 and 20-positions are routinely protected by forming the corresponding hydroxy compound or by forming a ketal during the process of introducing the novel cyclopentanono or cyclopentano moiety. A 17$\alpha$,21-dihydroxy-20-keto group is protected by formation of a corresponding 17,20;20,21-bismethylenedioxy group.

A 9$\alpha$-fluoro substituent is introduced into a compound of Formula C subsequent to the formation of the cyclopentanono or cyclopentano moiety by a conventional sequence. Thus, a 11$\beta$-hydroxy compound of Formula C, wherein R$^1$ is acetyl, is treated with mesyl chloride in dimethylformamide to form a corresponding $\Delta^{9(11)}$-unsaturated steroid. Addition of hypobromous acid to the $\Delta^{9(11)}$-unsaturated steroid yields a corresponding 9$\alpha$-bromo-11$\beta$-hydroxy steroid. Treatment of the latter compound with an alkali metal alkoxide in a corresponding alcohol, such as sodium methoxide in methanol, yields a corresponding 9$\beta$,11$\beta$-oxido compound, wherein the 21-hydroxy group reforms. The 21-acetoxy group is reformed by treating the 21-hydroxy compound with acetic anhydride in pyridine. Treatment of the 9$\beta$,11$\beta$-oxido compound with anhydrous hydrogen fluoride in tetrahydrofuran affords the desired 9$\alpha$-fluoro-11$\beta$-hydroxy compound.

A 1-dehydro system, e.g. wherein Z is a carbon-carbon double bond, is introduced into a compound of Formula C last by treatment of the 3-keto-$\Delta^4$-ene steroid, e.g. wherein Z is a carbon-carbon single bond, with 2,3-dichloro-5,6-dicyanobenzoquinone.

A 16$\alpha$,17$\alpha$ cyclic acetal or ketal, is a compound of Formula C or D, is introduced subsequent to the process of the present invention via a conventional technique. For example, a 16$\alpha$,17$\alpha$-dihydroxy compound of Formula C or D, is treated with an aldehyde or ketone in the presence of perchloric acid to form a corresponding 16$\alpha$,17$\alpha$-acetal or 16$\alpha$,17$\alpha$-ketal, respectively.

Substituents at the 17 carbon atom in compounds of Formula E, such as ethynyl, vinyl or the like, are preferably introduced by conventional techniques subsequent to the formation of the cyclopentano moiety. In the case of the cyclopentanono moiety, the 1'-oxo function is protected prior to the introduction of the desired C-17 substituent by conventional techniques.

Illustrative of the starting materials used in the preparation of the novel cyclopentanone and cyclopentano steroids of the present invention, are the following:

3 - methoxy - 6 - formyl - 11$\beta$,17$\alpha$ - dihydroxy - 21-acetoxypregna-3,5-dien-20-one;

6$\alpha$,7$\alpha$ - dichloromethylene-11$\beta$-hydroxy - 17,20;20,21-bis-methylenedioxypregna-4-en-3-one;

3-methoxy-6-formyl-17$\beta$ - hydroxyandrosta - 3,5-diene;

6$\alpha$,7$\alpha$-dichloromethylene - 17$\alpha$ - hydroxypregn - 4 - ene-3,20-dione and the 19-nor analog;

3 - methoxy-6-formyl-11$\beta$-hydroxy - 17$\alpha$,21-diacetoxypregna-3,5-dien-20-one;

6$\alpha$,7$\alpha$ - dichloromethylene-17$\beta$-hydroxyandrost - 4 - en-3-one and the 19-nor analog;

3 - methoxy-6-formyl-17$\beta$-hydroxy - 19 - norandrosta-3,5-diene;

3 - ethoxy - 6 - formyl - 16$\alpha$,17$\alpha$ - isopropylidenedioxypregna-3,5-dien-20-one;

6$\alpha$,7$\alpha$ - dichloromethylene - 17$\alpha$ - methyl-17$\beta$-hydroxyandrost-4-en-3-one;

3 - methoxy - 6 - formyl - 19 - norpregna - 3,5 - dien-20-one;

3 - methoxy - 6 - formyl - 11$\beta$ - hydroxy - 17$\alpha$,20;20,21-bismethylenedioxypregna-3,5-diene;

3 - methoxy - 6 - formyl - 17$\alpha$ - methyl - 17$\beta$-hydroxyandrosta-3,5-diene;

3 - methoxy - 6 - formyl - 17$\alpha$ - acetoxypregna - 3,5-dien-20-one;

3 - methoxy - 6 - formyl - 16$\alpha$ - methyl - 17$\alpha$-acetoxypregna-3,5-dien-20-one; and 6$\alpha$,7$\alpha$ - dichloromethylene - 11$\beta$ - hydroxy-16$\alpha$-methyl-17,20;20,21-bismethylenedioxypregn-4-en-3-one.

In addition to the process of the invention as exemplified in partial Formulas I→XI, the compounds of Formula D, wherein R$^5$ is methyl, are prepared from a corresponding compound of Formula C. Thus, an 11$\beta$-hydroxy-21-acetoxy compound of Formula C is allowed to react with mesyl chloride in dimethylformamide to introduce a $\Delta^{9(11)}$ double bond. Conventional hydrogenation of the $\Delta^{9(11)}$ double bond, such as with the Lindlar catalyst, affords the 9,11-dihydro compound. Basic hydrolysis of a 21-acetoxy compound, such as with potassium carbonate in methanol, affords a 21-hydroxy compound. The latter is allowed to react first with methane sulfonyl chloride to afford a 21-methanesulfonate, second with sodium iodide to afford a 21-iodo compound and third with sodium metabisulfite to form a 21-unsubstituted compound of Formula D.

The following examples serve to illustrate the invention but are not intended to limit the scope of the present invention.

PREPARATION A

A mixture of 0.5 g. of 6$\alpha$,7$\alpha$-dichloromethylene-17$\beta$-acetoxyandrost-4-en-3-one is allowed to reflux with 0.5 ml. of 2 N sodium hydroxide in 8 ml. of methanol under an inert atmosphere of nitrogen. The reaction mixture is then concentrated to a small volume and partitioned between a methylene chloride:aqueous sodium chloride mixture. The organic phase is separated, dried and evaporated to dryness. The residue is chromatographed on alumina and eluted with 50:50 ethyl ether:methylene chloride to yield 6-bismethoxymethylandrosta-4,6-dien-17β-ol-3-one which may be further purified by recrystallization from acetone:benzene.

A mixture of 1 g. of 6-bismethoxymethylandrosta-4,6-dien-17β-ol-3-one, 1 ml. of glacial acetic acid and 10 ml. of dioxane is allowed to reflux for three hours. At the end of the reaction, the product is extracted with ether and the extract is washed with water, dried and evaporated to dryness. The residue is chromatographed on alumina eluting with ethyl ether:methylene chloride to yield 6-formylandrosta-4,6-dien-17β-ol-3-one which may be purified by recrystallization from petroleum ether:acetone.

Utilizing the above procedure, the following 6α,7α-dichloromethylene compounds, namely:

6α,7α - dichloromethylene-11β-hydroxy - 17,20;20,21-bismethylenedioxypregn-4-ene-3,20-dione; and 6α,7α - dichloromethylene pregn - 4 - ene - 3,20 - dione are converted to the corresponding 6-formyl compounds, namely:

6 - formyl - 11β - hydroxy - 17,20;20,21-bismethylenedioxypregna-4,6-diene-3,20-dione; and 6-formylpregna-4,6-diene-3,20-dione, respectively.

PREPARATION B

To a solution of 1 g. of 3-methoxy-6-formyl-17,20; 20,21-bismethyleneoxypregna - 3,5 - dien - 11β-ol [prepared according to the procedure of D. Burn et al., Tetrahedron, 20, 597–609 (1964)] in 20 ml. of tetrahydrofuran, cooled to 0° C., is added 1.05 molar equivalents of 2,3-dichloro-5,6-dicyano-1,4 - benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate and evaporated to dryness to yield 6-formyl-11β-hydroxy-7,20;20,21-bismethylenedioxypregna-4,6-dien-3-one which may be further purified through recrystallization from acetone:hexane.

Utilizing the same procedure,

3 - methoxy-6-formyl-17β-hydroxy - 19 - norandrosta-3,5-diene;

3 - methoxy-6-formyl-17α-acetoxypregna - 3,5 - dien-20-one; and

3 - methoxy-6-formyl-17α-methylandrosta - 3,5-dien-17β-ol are converted to:

6-formyl-17β-hydroxy-19-norandrosta-4,6-dien-3-one;
6-formyl-17α-acetoxypregna-4,6-diene-3,20 - dione; and
6-formyl - 17α-methyl-17β - hydroxyandrosta-4,6-dien-3-one, respectively.

Example 1

A mixture of 1 g. of 6-formyl-11β-hydroxy-17,20;20,21-bismethylenedioxypregna-4,6-dien-3-one is dissolved in 45 ml. of ethanol and treated with 5 ml. of an aqueous saturated silver nitrate solution. To this mixture is then added an aqueous solution of 2 g. of potassium hydroxide in 10 ml. of water and the resulting mixture is allowed to stand at 25° C. for a period of two days. The mixture is filtered and the pH of the aqueous phase is adjusted to neutral. The aqueous phase is then extracted with ether. The extract is washed, dried and evaporated to dryness to yield 6-carboxy-11β-hydroxy-17,20;20,21-bismethylenedioxypregna-4,6-dien-3-one.

A mixture of 1 g. of the latter compound in 20 ml. of ether is allowed to react with an ethereal solution containing 1.1 molar equivalents of diazomethane. The reaction mixture is allowed to stand at 0° C. for a period of four hours and then warmed on a steam bath for five minutes. The ether is evaporated to dryness to yield 6-carbomethoxy-11β-hydroxy - 17,20;20,21 - bismethylenedioxypregna-4,6-dien-3-one which may be recrystallized from ethyl acetate:petroleum ether.

A solution of 1 g. of sodium borohydride in 3 ml. of water is added to an ice-cooled solution of 1 g. of the latter compound in 120 ml. of methanol and the mixture is then allowed to stand for 16 hours at room temperature. The excess reagent is decomposed by addition of sodium dihydrogen phosphate and the solution is then concentrated to small volume in vacuo and diluted with water. The product is extracted with ethyl acetate and these extracts are washed with water, dried and evaporated to yield 6-carbomethoxy-17,20;20,21-bismethylenedioxypregna-4,6-diene-3β,11β-diol which may be further purified by recrystallization from acetone:hexane.

A mixture of 1 g. of the latter compound in 20 ml. of tetrahydrofuran is allowed to react with a molar equivalent of dimethylsulfoxonium methylide [prepared according to Corey, E. J., et al., J. Am. Chem. Soc., 87, 1357 (1965)]. The reaction mixture is heated at reflux for four hours. The mixture is then cooled and evaporated to dryness. The residue is taken up in 20 ml. of methanol. The mixture is then irradiated with a 253 mu light source provided by a low pressure mercury arc lamp at room temperature for a period of three hours to yield a mixture of isomers of 6-carbomethoxymethyl-7 - methylsulfoxidomethyl - 17,20;20,21 - bismethylenedioxypregna-4-ene-3β,11β-diol.

A mixture of 2 g. of the isomeric mixture, 6-carbomethoxymethyl - 7 - methylsulfoxidomethyl-17,20;20,21-bismethylenedioxypregna-4-ene-3β,11β-diol, in 90 ml. of acetic acid and 10 ml. of water is allowed to react with 20 ml. of 30% hydrogen peroxide. The mixture is heated for two hours at 35° C. and then poured into ice water. The mixture is extracted with ether and the extract is dried over sodium sulfate and reduced to dryness. The residue is taken up in 20 ml. of t-butanol and allowed to react with a molar equivalent of potassium t-butoxide. The reaction mixture is held at 50° C. for a period of six hours. The product is extracted with ether and the ether extract is washed with water, dried and evaporated to dryness to yield an isomeric mixture of 5'-methylsulfonocyclopentan-1 - ono - [3',4';6,7] - 17,20; 20,21-bismethylenedioxypregn-4-ene-3β,11β-diol.

A mixture of 1 g. of the latter mixture in 20 ml. of benzene is treated with a molar equivalent of aluminum amalgam and the reaction mixture is allowed to stand at 25° C. for a period of ten hours. The mixture is washed with water and diluted with ether. The extract is dried and evaporated to dryness to yield an isomeric mixture of cyclopentan - 1' - ono-[3',4';6,7]-17,20;20,21-bismethylenedioxypregn-4-ene-3β,11β-diol.

An isomeric mixture of 1 g. of cyclopentan-1-ono-[3',4';6,7]-17,20;20,21-bismethylenedioxypregn - 4 - ene - 3β, 11β-diol, 2 g. of hydrazine hydrate, 1.2 g. of potassium hydroxide, 1.2 ml. of water and 1.2 ml. of diethylene glycol is heated for 45 minutes at reflux, then in an open flask until the temperature of the reaction mixture is 200° C., and finally for an additional two hours at reflux. The mixture is cooled, water added and the product isolated by extraction with ether. These extracts are dried over sodium sulfate and evaporated to yield cyclopentano-[3',4';6,7] - 17,20;20,21 - bismethylenedioxypregn-4-ene-3β,11β-diol which may be further purified through recrystallization from acetone:hexane. If desired, the latter material can be chromatographed on a column containing alumina to separate the 6α,7α and 6β,7β-isomers.

One gram of the latter isomer mixture in 100 ml. of chloroform which has been distilled over calcium chloride, is stirred for 18 hours at room temperature with 10 g. of freshly precipitated manganese dioxide. The inorganic material is then removed by filtration and washed with hot chloroform and the combined filtrate and washings are evaporated to yield cyclopentano-[3',4';6,7]-11β - hydroxy - 17,20;20,21 - bismethylenedioxypregn - 4-en-3-one which may be further purified through recrystallization from acetone:hexane. The latter material is chromatographed on a column containing alumina eluting with ethyl acetate to yield the 6α,7α and 6β,7β-isomers.

Utilizing the above procedure, the following starting materials, namely 6-formyl-11β-hydroxy-16α - methyl - 17,20;20,21 - bismethylenedioxypregna-4,6-dien-3-one;
6-formyl-17α-hydroxypregna-4,6-diene-3,20-dione; and
6-formyl-17β-hydroxy-19-norandrosta-4,6-dien-3 - one, are converted to the 6α,7α and 6β,7β-isomers of cyclopentano-[3',4';6,7]-11β-hydroxy - 16α - methyl-17,20;20,21-bismethylenedioxypregn-4-en-3-one;

cyclopentano-[3',4';6,7]-17α-hydroxypregn - 4 - ene-3,20-dione; and cyclopentano - [3',4';6,7]-17β-hydroxy-19-norandrost-4-en-3-one, respectively.

Example 2

A suspension of 1 g. of an isomeric mixture of cyclopentano - [3',4';6,7] - 11β - hydroxy - 17,20;20,21 - bismethylenedioxypregn-4-en-3-one in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield cyclopentano - [3',4';6,7] - 11β,17α,21 - trihydroxypregn - 4-ene-3,20-dione which may be further purified through recrystallization from isopropanol. The latter material is chromatographed on a column containing alumina eluting with ethyl acetate to yield the 6α,7α and 6β,7β-isomers.

A mixture of 1 g. of the latter isomeric compound, 4 ml. of pyridine and 2 ml. of acetic anhydride is allowed to stand at room temperature for 15 hours. The mixture is then poured into ice water and the solid which forms is collected by filtration, washed with water and dried to yield cyclopentano - [3',4';6,7] - 11β,17α - dihydroxy - 21-acetoxypregn-4-ene-3,20-dione which may be further purified through recrystallization from acetone:hexane. The latter material is chromatographed on a column containing alumina eluting with ethyl acetate to yield the 6α,7α and 6β,7β-isomers.

Utilizing the above procedure, cyclopentano-[3',4';6,7]-11β - hydroxy - 16α - methyl - 17,20;20,21 - bismethylenedioxypregn-4-en-3-one; is converted to cyclopentano-[3',4';6,7] - 11β,17α - dihydroxy - 16α-methyl-21-acetoxypregn-4-ene-3,20-dione.

Example 3

One gram of cyclopentano-[3',4';6α,7α]-11β,17α-dihydroxy-21-acetoxypregn-4-ene-3,20-dione is dissolved with slow heating in 12.5 ml. of dimethylformamide. The mixture is cooled and 0.42 g. of mesylchloride and 0.5 ml. of pyridine are added. The solution is heated at 80° C. for 30 minutes, then cooled, diluted with water and extracted with ethyl acetate. The extracts are washed with water, dried over sodium sulfate and evaporated to yield cyclopentano - [3',4';6α,7α] - 17α - hydroxy - 21 - acetoxypregna-4,9(11)-diene-3,20-dione which may be further purified through recrystallization from acetone:hexane.

Twenty-eight grams of N-bromoacetamide are added over a one hour period with stirring, in the dark and at room temperature, to a mixture of 50 g. of the latter compound, 500 ml. of pure dioxane and 8 ml. of 0.4 N perchloric acid. The reaction mixture is stirred for an additional hour and a solution of 10% sodium sulfite is then added until negative to potassium-starch indicator paper. Ice is added and the mixture extracted with chloroform. These extracts are washed consecutively with water, 5% aqueous sodium bicarbonate solution and water, and the solvent then removed by distillation in vacuo. The residue is triturated with acetone to yield the bromohydrin intermediate.

A mixture of 20 g. of anhydrous potassium acetate and 200 ml. of acetone is heated almost to boiling and a solution of 17 g. of the bromohydrin intermediate in 200 ml. of acetone is then slowly added with stirring. The mixture is refluxed for ten hours, cooled and almost all of the acetone is removed by distillation. Iced water is then added and the solid which forms is collected by filtration, washed with water and dried, to yield cyclopentano-[3',4'; 6α,7α] - 9β,11β - oxido - 17α,21 - dihydroxypregn - 4 - ene-3,20-dione which may be further purified through recrystallization from methylene chloride:benzene.

A mixture of 1 g. of the latter compound, 4 ml. of pyridine and 2 ml. of acetic anhydride is allowed to stand at room temperature for 15 hours. The mixture is then poured into ice water and the solid which forms is collected by filtration, washed with water and dried to yield cyclopentano - [3',4';6α,7α] - 9β,11β - oxido - 17α - hydroxy-21-acetoxypregn-4-ene,3,20-dione which may be further purified through recrystallization from acetone: hexane.

To a stirred solution of 1.8 g. of the latter compound in 30 ml. of methylene chloride, cooled to 0° C., is added a cooled solution (—70° C.) of 2.11 g. of anhydrous hydrogen fluoride in 3.7 ml. of tetrahydrofuran over a period of 20 minutes. The mixture is stirred at a temperature below 10° C. for six hours and then neutralized by the cautious addition of 5% aqueous sodium bicarbonate solution. The organic layer is separated, washed with water, dried over sodium sulfate and concentrated until solid forms. The cooled mixture is then filtered and the solid dissolved in hot ethyl acetate. This solution is filtered hot and then cooled and the solid which forms is collected by filtration to yield cyclopentano-[3',4';6α,7α]-9α-fluoro-11β,17α-dihydroxy-21-acetoxypregn-4-ene-3,20-dione.

Utilizing the same procedure, cyclopentano-[3',4'; 6α,7α] - dihydroxy - 16α - methyl - 21 - acetoxypregn - 4-ene-3,20-dione, is converted to cyclopentano-[3',4';6α,7α]-9α - fluoro - 11β,17α - dihydroxy - 21 - acetoxypregn - 4-ene-3,20-dione.

Example 4

A mixture of 0.5 g. of cyclopentano-[3',4';6α,7α]-11β, 17α-dihydroxy-21-acetoxypregn-4-ene-3,20-dione, 10 ml. of dioxane and 0.35 g. of 2,3-dichloro-5,6-dicyano-1,4-benzoquinone is refluxed for ten hours. The mixture is then cooled, filtered and evaporated to dryness. The residue is dissolved in acetone and this solution is then filtered through 10 g. of alumina and concentrated to yield cyclopentano - [3',4';6α,7α] - 11β,17α - dihydroxy - 21-acetoxypregna-1,4-diene-3,20-dione which is further purified by recrystallization from acetone:hexane.

Utilizing the same procedure, the following starting materials, namely

Cyclopentano-[3',4'; 6β,7β]-11β,17α-dihydroxy-21-acetoxypregn-4-ene-3,20-dione;

Cyclopentano - [3',4'; 6α,7α] - 11β,17α-dihydroxy-16α-methyl-21-acetoxypregn-4-ene-3,20-dione;

Cyclopentano - [3',4'; 6α,7α] - 9α-fluoro-11β,17α-dihydroxy-21-acetoxypregn-4-ene-3,20-dione; and Cyclopentano - [3',4'; 6α,7α] - 9α-fluoro-11β,17α-dihydroxy-16α-methyl-21-acetoxypregn-4-ene-3,20 - dione; are converted to the corresponding Δ$^{1,4}$-dienes, namely Cyclopentano-[3',4'; 6β,7β]-11β,17α-dihydroxy-21-acetoxypregna-1,4-diene-3,20-dione;

Cyclopentano - [3',4'; 6α,7α]-11β,17α-dihydroxy-16α-methyl-21-acetoxypregna-1,4-diene-3,20-dione;

Cyclopentano - [3',4'; 6α,7α]-9α-fluoro-11β,17α-dihydroxy-21-acetoxypregna-1,4-diene-3,20-dione; and Cyclopentano - [3',4'; 6α,7α]-9α-fluoro-11β,17α - dihydroxy - 16α - methyl - 21-acetoxypregna-1,4-diene-3,20-dione, respectively.

Example 5

One gram of cyclopentano-[3',4'; 6α,7α]-17α-hydroxy-21-acetoxypregn-4-ene-3,20-dione is dissolved with slow heating in 12.5 ml. of dimethylformamide. The mixture is cooled and 0.42 g. of mesylchloride and 0.5 ml. of pyridine are added. The solution is heated at 80° C. for 30 minutes, then cooled, diluted with water and extracted with ethyl acetate. The extracts are washed with water, dried over sodium sulfate and evaporated to yield cyclopentano-[3',4'; 6α,7α]-17α-hydroxy-21-acetoxypregna-4,9

(11)-diene-3,20-dione which may be further purified through recrystallization from acetone:hexane.

A solution of 2.0 g. of the latter compound in 100 ml. of ethyl acetate is hydrogenated with 0.1 g. of platinum oxide catalyst until the theoretical amount of hydrogen is consumed. The catalyst is removed by filtration and the filtrate is evaporated to dryness to yield cyclopentano-[3',4'; 6α,7α] - 17α-hydroxy-21-acetoxypregn-4-ene-3,20-dione which may be further purified by recrystallization from acetone:hexane.

A suspension of 1 g. of the latter compound in 60 ml. of methanol is treated with a solution of 1 g. of potassium carbonate in 6 ml. of water. The mixture is heated at reflux for one hour, cooled in ice and diluted with water. The solid which forms is collected by filtration, washed with water and dried to yield cyclopentano-[3'4'; 6α,7α]-17α,21-dihydroxy-pregn-4-ene-3,20-dione which is recrystallized from acetone:hexane.

A mixture of 1.34 g. of the later compound, 0.38 ml. of methanesulfonyl chloride and 10 ml. of pyridine is allowed to stand at room temperature for 16 hours and is then poured into ice water and extracted with methylene chloride. The extracts are washed with 2 N hydrochloric acid, aqueous potassium bicarbonate solution and saturated aqueous sodium chloride solution, dried over magnesium sulfate and evaporated to dryness. This residue and 3.6 g. of sodium iodide is added to 150 ml. of acetone, boiled for 40 minutes and evaporated to dryness under reduced pressure. The residue is extracted with methylene chloride. These extracts are washed with saturated aqueous sodium chloride solution, dried over magnesium sulfate and evaporated to dryness. A suspension of the residue and 2.6 g. of sodium metabisulfite in 300 ml. of 80% aqueous ethanol is heated at reflux for one hour and then evaporated under reduced pressure at a temperature below 45° C. The residue is partitioned between water and methylene chloride and the phases are then separated. The organic phase is washed with saturated aqueous sodium chloride solution, dried and evaporated to dryness to yield cyclopentano-[3',4'; 6α,7α]-17α-hydroxypregn-4-ene-3,20-dione which may be further purified through recrystallization from acetone:hexane.

A mixture of 1 g. of the latter compound, 1 g. of p-toluenesulfonic acid monohydrate, 50 ml. of acetic acid and 25 ml. of acetic anhydride is allowed to stand at room temperature for 24 hours, and then is puored into water and stirred. This mixture is then extracted with methylene chloride and these extracts are dried and evaporated. The residue is then dissolved in 250 ml. of methanol containing 5 ml. of concentrated hydrochloric acid. After refluxing for one hour, the mixture is neutralized with an aqueous 10% solution of potassium bicarbonate and evaporated. The residue is extracted with methylene chloride, and the methylene chloride extract is washed with water to neutrality, dried and evaporated to yield cyclopentano-[3',4'; 6α,7α]-17α-acetoxypregn-4-ene-3,20 dione which is recrystallized from acetone:ether.

Example 6

One gram of cyclopentan-1'-ono-[3',4'; 6,7]-17,20; 20, 21-bismethylenedioxypregn-4-ene-3β,11β-diol in 100 ml. of chloroform which has been distilled over calcium chloride, is stirred for 18 hours at room temperature with 10 g. of freshly precipitated manganese dioxide. The inorganic material is then removed by filtration and washed with hot chloroform and the combined filtrate and washings are evaporated to yield [cyclopentan-1'-ono-[3',4'; 6, 7]]-11β-hydroxypregn-4-en-3-one which may be further purified through recrystallization from acetone:hexane.

The latter material is chromatographed on a column containing alumina to separate the 6α,7α and 6β,7β-isomers.

Utilizing the above procedure, the following starting materials, namely

3β-hydroxycyclopentan-1-ono-[3',4'; 6,7]-17α-hydroxypregn-4-en-20-one and

Cyclopentan-1-ono-[3',4'; 6,7]-19-norandrost-4-ene-3β, 17β-diol are converted to the 6α,7α and 6β,7β-isomers namely, Cyclopentan-1-ono - [3',4'; 6,7] - 17α-hydroxypregn-4-ene-3,20-dione and Cyclopentan-1-ono - [3',4'; 6,7] - 17β-hydroxy-19-norandrost-4-en-3-one, respectively.

What is claimed is:

1. A steroid of the pregnane series having the following formula:

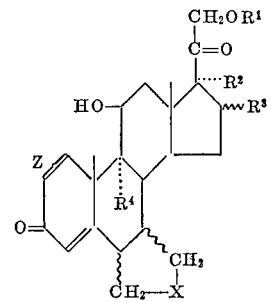

wherein

X is a methylene or carbonyl group;

Z is a carbon-carbon single bond or a carbon-carbon double bond;

$R^1$ is hydrogen, tetrahydropyran-2'-yl, tetrahydrofuran-2'-yl or a hydrocarbon carboxylic acyl group containing less than 12 carbon atoms;

$R^2$ is hydrogen, hydroxy or a hydrocarbon carboxylic acyloxy group containing less than 12 carbon atoms;

$R^3$ is hydrogen, α-methyl, β-methyl, α-hydroxy or a α-hydrocarbon carboxylic acyloxy group of less than 12 carbon atoms;

$R^2$ and $R^3$ together is the group

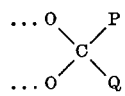

wherein P is hydrogen or lower alkyl and Q is lower alkyl or aryl of up to 8 carbon atoms; and $R^4$ is hydrogen or fluoro.

2. A steroid according to claim 1 wherein X is a methylene group; Z is a carbon-carbon single bond; $R^1$ is hydrogen; $R^2$ is hydroxy; and $R^3$ is α-methyl.

3. A steroid according to claim 1 wherein X is a carbonyl group; Z is a carbon-carbon single bond; $R^1$ is hydrogen; $R^2$ is hydroxy; and $R^3$ is α-methyl.

4. A steroid according to claim 1 wherein X is a methylene group; Z is a carbon-carbon double bond; $R^1$ is hydrogen; $R^2$ is hydroxy; and $R^3$ is α-methyl.

5. A steroid according to claim 1 wherein X is a carbonyl group; Z is a carbon-carbon double bond; $R^1$ is hydrogen; $R^2$ is hydroxy; and $R^3$ is α-methyl.

6. A steroid according to claim 1 wherein X is a methylene group; Z is a carbon-carbon single bond; $R^1$ is hydrogen; and $R^2$ and $R^3$ together is the group

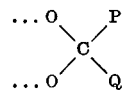

wherein each of P and Q is methyl.

7. A steroid according to claim 1 wherein X is a carbonyl group; Z is a carbon-carbon single bond; $R^1$ is hydrogen; and $R^2$ and $R^3$ together is the group

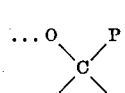

wherein each of P and Q is methyl.

8. A steroid according to claim 1 wherein X is a methylene group; Z is a carbon-carbon double bond; $R^1$ is hydrogen; and $R^2$ and $R^3$ together is the group

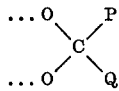

wherein each of P and Q is methyl.

9. A steroid according to claim 1 wherein X is a carbonyl group; Z is a carbon-carbon double bond; $R^1$ is hydrogen; and $R^2$ and $R^3$ together is the group

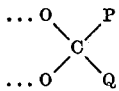

wherein each of P and Q is methyl.

10. A steroid of the pregnane series having the following formula:

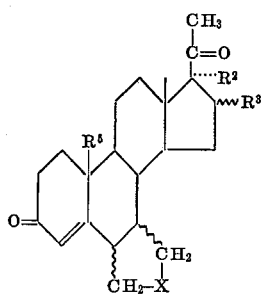

wherein

X is a methylene or carbonyl group;
$R^2$ is hydrogen, hydroxy or a hydrocarbon carboxylic acyloxy group containing less than 12 carbon atoms;
$R^3$ is hydrogen, α-methyl, β-methyl, α-hydroxy or an α-hydrocarbon carboxylic acyloxy group of less than 12 carbon atoms;
$R^2$ and $R^3$ together is the group

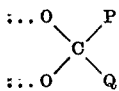

in which P is hydrogen or lower alkyl and Q is a lower alkyl or aryl group of up to 8 carbon atoms; and
$R^5$ is hydrogen or methyl.

11. A steroid according to claim 10 wherein $R^2$ is acetoxy; $R^3$ is hydrogen; and $R^5$ is methyl.

12. A steroid according to claim 10 wherein $R^2$ is acetoxy; $R^3$ is α-methyl; and $R^5$ is methyl.

13. A steroid of the androstane series having the following formula:

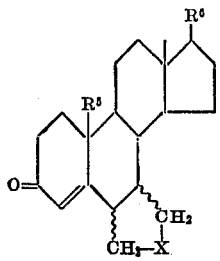

wherein

X is a methylene or carbonyl group;
$R^5$ is hydrogen or methyl;
$R^6$ is keto or the group

in which $R^7$ is hydrogen, tetrahydropyran-2'-yl, tetrahydrofuran-2'-yl or a hydrocarbon carboxylic acyl group containing less than 12 carbon atoms and $R^8$ is hydrogen, lower alkyl, alkenyl or alkynyl.

14. A steroid according to claim 13 wherein $R^5$ is methyl; $R^6$ is the group

in which each of $R^7$ and $R^8$ is hydrogen.

15. A steroid according to claim 13 wherein $R^5$ is hydrogen; and $R^6$ is the group

in which each of $R^7$ and $R^8$ is hydrogen.

16. A steroid according to claim 13 wherein $R^5$ is methyl; and $R^6$ is the group

in which $R^7$ is hydrogen and $R^8$ is methyl.

17. A steroid according to claim 13 wherein $R^5$ is hydrogen; and $R^6$ is the group

in which $R^7$ is hydrogen and $R^8$ is methyl.

18. A steroid according to claim 13 wherein $R^5$ is methyl; and $R^6$ is the group

in which $R^7$ is hydrogen and $R^8$ is ethynyl.

19. A steroid according to claim 13 wherein $R^5$ is hydrogen; and $R^6$ is the group

in which $R^7$ is hydrogen and $R^8$ is ethynyl.

20. A steroid according to claim 13 wherein X is a methylene group.

References Cited

UNITED STATES PATENTS 3,243,434   3/1966   Krakower _____ 260—239.55

LEWIS GOTTS, *Primary Examiner.*
ETHEL G. LOVE, *Assistant Examiner.*

U.S. Cl. X.R.

204—158; 260—239.5, 397.1, 397.3, 397.4, 397.45, 999